（12） United States Patent
Sone (10) Patent No.: US 12,024,152 B2
(45) Date of Patent: Jul. 2, 2024

(54) MOTOR CONTROL DEVICE (71) Applicant: SUZUKI MOTOR CORPORATION, Hamamatsu (JP)

(72) Inventor: Takayuki Sone, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 125 days.

(21) Appl. No.: 17/552,251

(22) Filed: Dec. 15, 2021

(65) Prior Publication Data

US 2022/0203955 A1 Jun. 30, 2022

(30) Foreign Application Priority Data

Dec. 25, 2020 (JP) ................. 2020-216380

(51) Int. Cl.
B60W 10/06 (2006.01)
B60W 10/10 (2012.01)
(52) U.S. Cl.
CPC ............ B60W 10/06 (2013.01); B60W 10/10 (2013.01); B60W 2510/0638 (2013.01)
(58) Field of Classification Search
CPC ................. B60W 10/06; B60W 10/10; B60W 2510/0638
USPC .......................................................... 701/1
See application file for complete search history.

(56) References Cited

U.S. PATENT DOCUMENTS 10,569,640 B2 * 2/2020 Baba ..................... B60W 10/08
2013/0297136 A1 * 11/2013 Yamanaka ............ B60W 10/10
903/930

2016/0221467 A1 8/2016 Suzuki et al.
2019/0217852 A1 * 7/2019 Komoda ............... B60W 10/06
2021/0229550 A1 7/2021 Isami

FOREIGN PATENT DOCUMENTS

JP 2010-88154 A 4/2010
JP 6787507 B1 11/2020

OTHER PUBLICATIONS

Extended European Search Report dated May 19, 2022, issued by the European Patent Office in corresponding application EP 21215726.7.

* cited by examiner

Primary Examiner — Lindsay M Low
Assistant Examiner — Omar Morales
(74) Attorney, Agent, or Firm — Stein IP, LLC (57) ABSTRACT There is provided a motor control device that is configured to control a drive motor configured to output a driving force to a wheel, the motor control device including: a calculation circuit that is configured to calculate an instruction value based on an amount of an accelerator operation, a motor rotation speed, and an amount of a change operation; and a control circuit that is configured to control the driving force of the drive motor in accordance with the instruction value from the calculation circuit. The calculation circuit is configured to form a virtual clutch configured to change a power transmission ratio between the drive motor and the wheel according to the amount of the change operation, and to calculate the instruction value corresponding to coasting traveling according to the motor rotation speed when the virtual clutch is disengaged.

5 Claims, 6 Drawing Sheets

MOTOR CONTROL DEVICE

CROSS-REFERENCE TO RELATED APPLICATIONS

This application is based on Japanese Patent Application No. 2020-216380 filed on Dec. 25, 2020, the contents of which are incorporated herein by way of reference.

TECHNICAL FIELD

The present invention relates to a motor control device.

BACKGROUND

An engine-equipped vehicle is provided with a clutch mechanism that transmits or cuts off a driving force of the engine. When the clutch mechanism is operated based on a clutch operation of a driver, a gear shift or transmission or cut-off of the driving force of the engine is performed in accordance with an intention of the driver. On the other hand, as an electric vehicle having no clutch mechanism, there is known an electric vehicle including a motor control device that controls a drive motor in response to an accelerator operation (for example, see Patent Literature 1). In the motor control device disclosed in Patent Literature 1, an output signal corresponding to an accelerator operation amount is output to a control circuit, and a drive current flowing through the drive motor is controlled by the control circuit.

Patent Literature 1: JP-A-2010-088154

However, in the electric vehicle, it is necessary to adjust the driving force only by the accelerator operation, but since a response of the drive motor with respect to the accelerator operation is fast, a delicate accelerator operation is required for the electric vehicle. In order to facilitate the accelerator operation, a rapid torque fluctuation of the drive motor can be suppressed by filter control (delay control), but a direct response of the drive motor with respect to the accelerator operation is lost.

The present invention has been made in view of the above, and an object of the present invention is to provide a motor control device capable of giving a good operation feeling without lowering response performance of a drive motor.

SUMMARY

In order to solve the above problem, there is provided a motor control device according to an aspect of the present invention that is configured to control a drive motor configured to output a driving force to a wheel, the motor control device including: an accelerator operator that is configured to receive an accelerator operation; a change operator that is configured to receive a change operation for the driving force of the drive motor; a rotation speed sensor that is configured to detect a motor rotation speed of the drive motor; a calculation circuit that is configured to calculate an instruction value based on an amount of the accelerator operation, the motor rotation speed, and an amount of the change operation; and a control circuit that is configured to control the driving force of the drive motor in accordance with the instruction value from the calculation circuit. The calculation circuit is configured to form a virtual clutch configured to change a power transmission ratio between the drive motor and the wheel according to the amount of the change operation, and to calculate the instruction value corresponding to coasting traveling according to the motor rotation speed when the virtual clutch is disengaged.

DESCRIPTION OF EMBODIMENTS

A motor control device according to an aspect of the present invention controls a drive motor that outputs a driving force to a wheel. An accelerator operation is received by an accelerator operator, a change operation for the driving force of the drive motor is received by a change operator, and a motor rotation speed of the drive motor is detected by a rotation speed sensor. The motor control device is provided with a calculation circuit and a control circuit, an instruction value is calculated by the calculation circuit based on an accelerator operation amount, the motor rotation speed, and a change operation amount, and the driving force of the drive motor is controlled by the control circuit according to the instruction value from the calculation circuit. Since a virtual clutch that changes a power transmission ratio between the drive motor and the wheel according to the change operation amount is formed by the calculation circuit, an operation feeling given by the electric vehicle can be brought close to that given by a clutch mechanism of an engine-equipped vehicle. Further, when the virtual clutch is disengaged, an instruction value corresponding to coasting traveling according to the motor rotation speed is calculated, and the operation feeling given by the electric vehicle can be brought close to the operation feeling given by the engine-equipped vehicle by pseudo coasting traveling by the drive motor. Further, since a flywheel or the like is not provided, inertia applied to the drive motor can be reduced, and the response performance of the drive motor can be maximized.

EMBODIMENT

Figure 1:
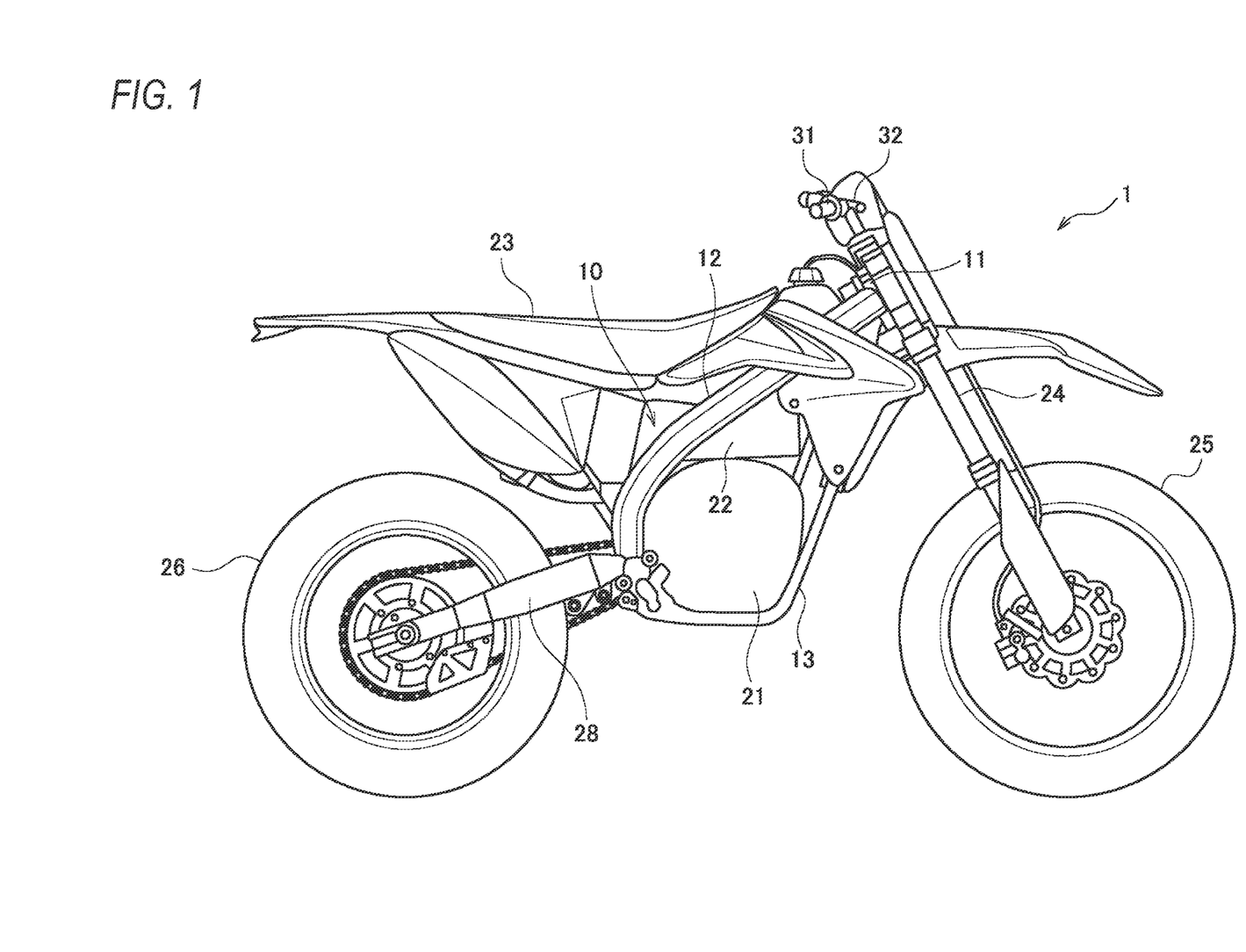
FIG. 1 is a right side view of a straddle-type vehicle according to an present embodiment.

Hereinafter, the present embodiment will be described in detail with reference to the accompanying drawings. FIG. 1 is a right side view of a straddle-type vehicle according to the present embodiment. Further, in the following drawings, an arrow FR indicates a vehicle front side, an arrow RE indicates a vehicle rear side, an arrow L indicates a vehicle left side, and an arrow R indicates a vehicle right side.

As illustrated in FIG. 1, the straddle-type vehicle 1 is configured by mounting various components such as a drive motor 21 and an electrical system on a cradle-type vehicle body frame 10. The vehicle body frame 10 includes a pair of main tubes 12 that extend rearward from a head pipe 11 and then bend downward, and a pair of down tubes 13 that extend downward from the head pipe 11 and then bend rearward. A rear side of the drive motor 21 is supported by the pair of main tubes 12, and a front side and a lower side of the drive motor 21 are supported by the pair of down tubes 13. A battery 22 is supported on an inner side of the pair of main tubes 12, and a rider seat 23 is provided on an upper side of the battery 22.

A pair of front forks 24 are steerably supported by the head pipe 11 via a steering shaft (not shown), and a front wheel 25 is rotatably supported at lower portions of the front forks 24. A swing arm 28 is swingably supported at rear half portions of the main tubes 12, and a rear wheel 26 is rotatably supported at a rear end of the swing arm 28. A handlebar 27 (see FIG. 2) is provided on an upper side of the front forks 24. A handle grip 41 and a clutch lever 42 (see FIG. 2) are provided on a left side of the handlebar 27, and an accelerator grip 31 and a brake lever 32 are provided on a right side of the handlebar 27.

In such an electric straddle-type vehicle 1, drive control in which electric power is supplied from the battery 22 to the drive motor 21 is performed at the time of speeding up. A driving force is transmitted from the drive motor 21 to the rear wheel 26 by the drive control so that the straddle-type vehicle 1 travels. At the time of slowing down, the drive motor 21 is operated as a generator, and regenerative control in which the battery 22 is charged with electric power from the drive motor 21, is performed. By the regenerative control, a driving force is transmitted from the rear wheel 26 to the drive motor 21 so that the drive motor 21 generates electric power. The drive control and the regenerative control are performed by a motor control device 30 (see FIG. 2) controlling the drive motor 21.

A drive motor of a general electric vehicle responds to an accelerator operation faster than an engine, and the drive motor may respond sensitively to cause a rapid torque fluctuation. Although the rapid torque fluctuation is suppressed by filter control, response performance of the drive motor with respect to the accelerator operation is lowered. Although a clutch mechanism can be added to the electric vehicle, a flywheel is required to suppress fluctuation in a rotation speed at the time when no load is applied. However, the weight and space are increased due to the clutch mechanism and the flywheel, and a high-torque drive motor is required to compensate for a decrease in responsiveness due to the flywheel.

Figure 2:
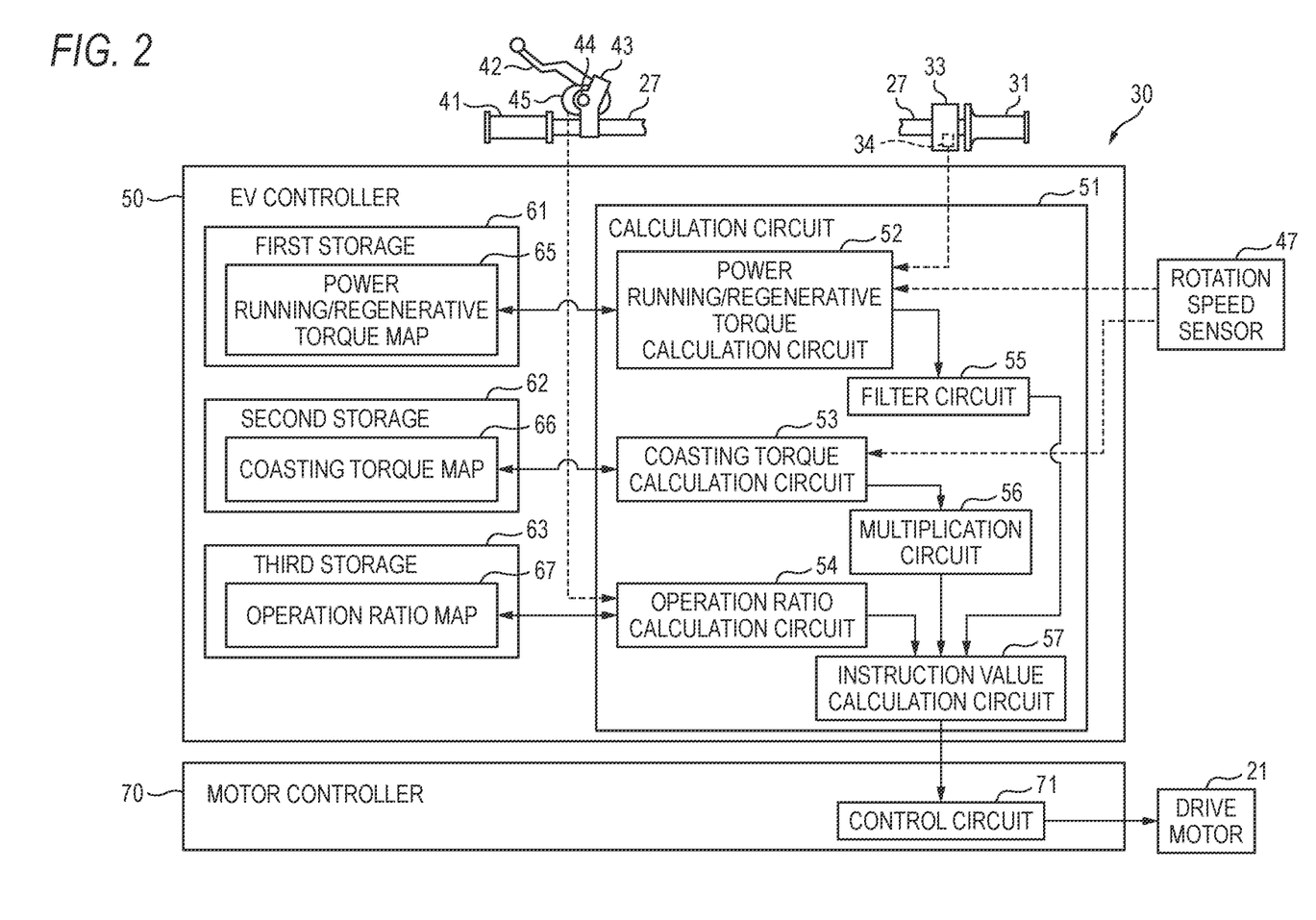
FIG. 2 is a schematic diagram of a motor control device according to the present embodiment.

Therefore, in the motor control device 30 of the present embodiment, a virtual clutch is formed that is capable of supplementally adjusting, by a clutch operation, a driving force of the drive motor 21 adjusted by an accelerator operation. By combining the accelerator operation and the clutch operation, adjustment of the driving force of the drive motor 21 is made easy, and the operation feeling is brought close to that given by the engine-equipped vehicle. In addition, in a state where the virtual clutch is completely disengaged, pseudo coasting traveling is implemented by the motor control device 30, and thus coasting traveling different from actual traveling resistance is performed, and it is possible to improve and arrange the influence exerted by a vehicle body weight, inertia, and the like on the operation feeling.

Hereinafter, the motor control device will be described with reference to FIG. 2. FIG. 2 is a schematic diagram of the motor control device according to the present embodiment. In the following description, reference signs in FIG. 1 are used as appropriate.

As illustrated in FIG. 2, the motor control device 30 is provided with the accelerator grip (accelerator operator) 31 that receives an accelerator operation performed by a driver, and the clutch lever (change operator) 42 that receives a clutch operation performed by the driver. The accelerator grip 31 is rotatably attached to a right side of the handlebar 27, and the driving force of the drive motor 21 is adjusted according to an accelerator operation amount of the accelerator grip 31. A sensor housing 33 is provided at a base end side of the accelerator grip 31, and an accelerator sensor 34 that detects the accelerator operation amount is accommodated in the sensor housing 33.

The clutch lever 42 is attached to a left side of the handlebar 27 via a holder 43, and a power transmission ratio between the drive motor 21 and the rear wheel 26 is adjusted in a pseudo manner according to a clutch operation amount of the clutch lever 42. When the clutch lever 42 is not operated, a clutch engagement state is reproduced in a pseudo manner by the motor control device 30, and when the clutch lever 42 is operated, a clutch disengagement state and a half-clutch state are reproduced in a pseudo manner by the motor control device 30. The clutch lever 42 is pivotally supported by a rotary shaft 44 of the holder 43, and a clutch sensor 45 that detects the clutch operation amount is attached to the rotary shaft 44.

In addition, the motor control device 30 is provided with a rotation speed sensor 47 that detects a motor rotation speed of the drive motor 21, an electric vehicle (EV) controller 50, and a motor controller 70. The rotation speed sensor 47 is configured with a resolver attached to the drive motor 21. The EV controller 50 is provided with a calculation circuit 51 that calculates a torque instruction value of a driving force for the drive motor 21, and first to third storages 61 to 63. A power running/regenerative torque map 65 is stored in the first storage 61, a coasting torque map 66 is stored in the second storage 62, and an operation ratio map 67 is stored in the third storage 63.

The power running/regenerative torque map 65 is a three-dimensional map for obtaining a power running/regenerative torque value based on the accelerator operation amount and the motor rotation speed, using the accelerator operation amount, the motor rotation speed, and the power running/regeneration torque value as coordinate axes. The coasting torque map 66 is a two-dimensional map for obtaining a coasting torque value during coasting traveling based on the motor rotation speed, using the motor rotation speed and the coasting torque value as coordinate axes. The operation ratio map 67 is a two-dimensional map for obtaining an operation ratio value of an actual clutch operation amount with respect to a maximum clutch operation amount, using the clutch operation amount and the operation ratio value as coordinate axes. As the maps 65 to 67, maps obtained experimentally, empirically, and theoretically in advance are used.

Figure 3A:
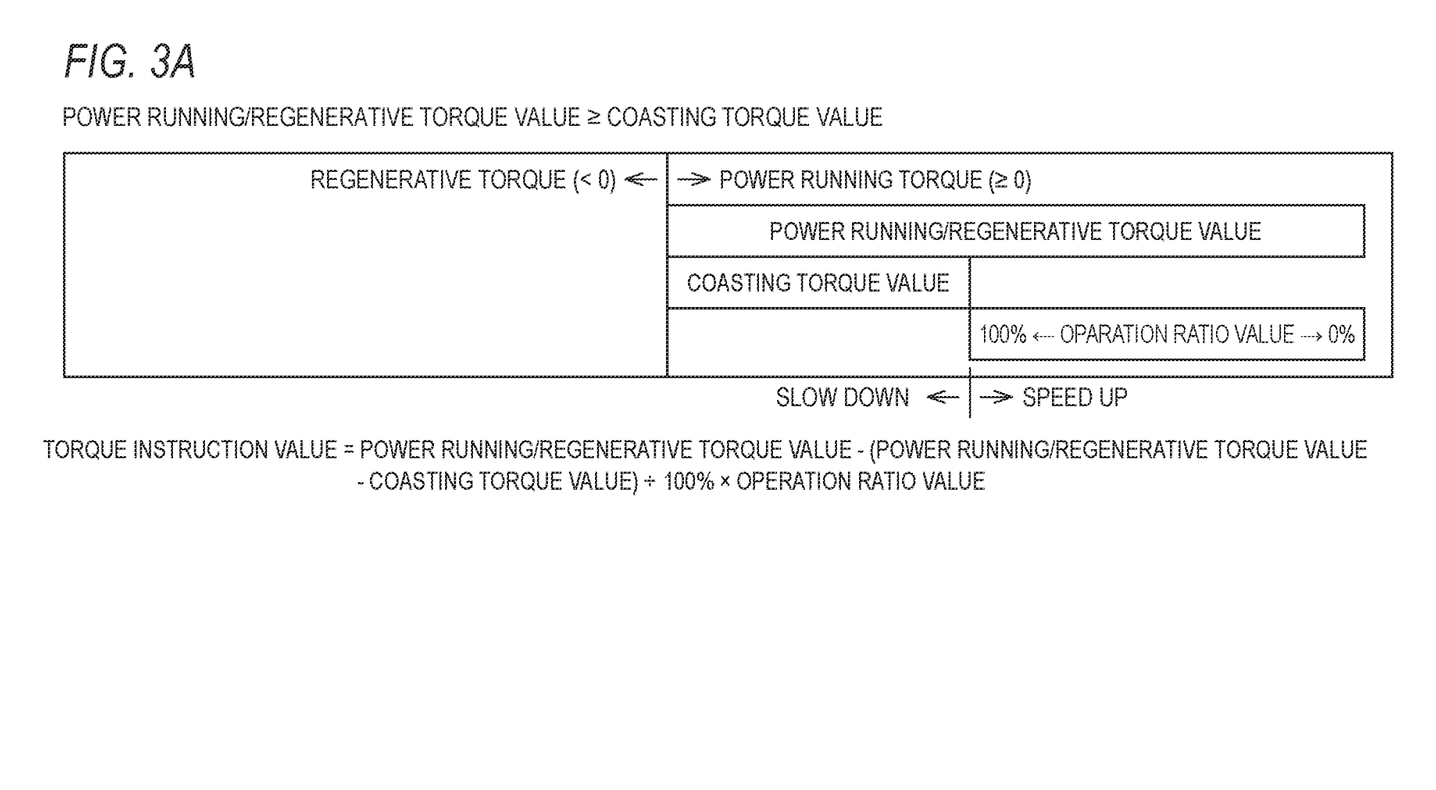
FIG. 3A is a schematic diagram of an image of calculation of a torque instruction value according to the present embodiment.
Figure 3B:
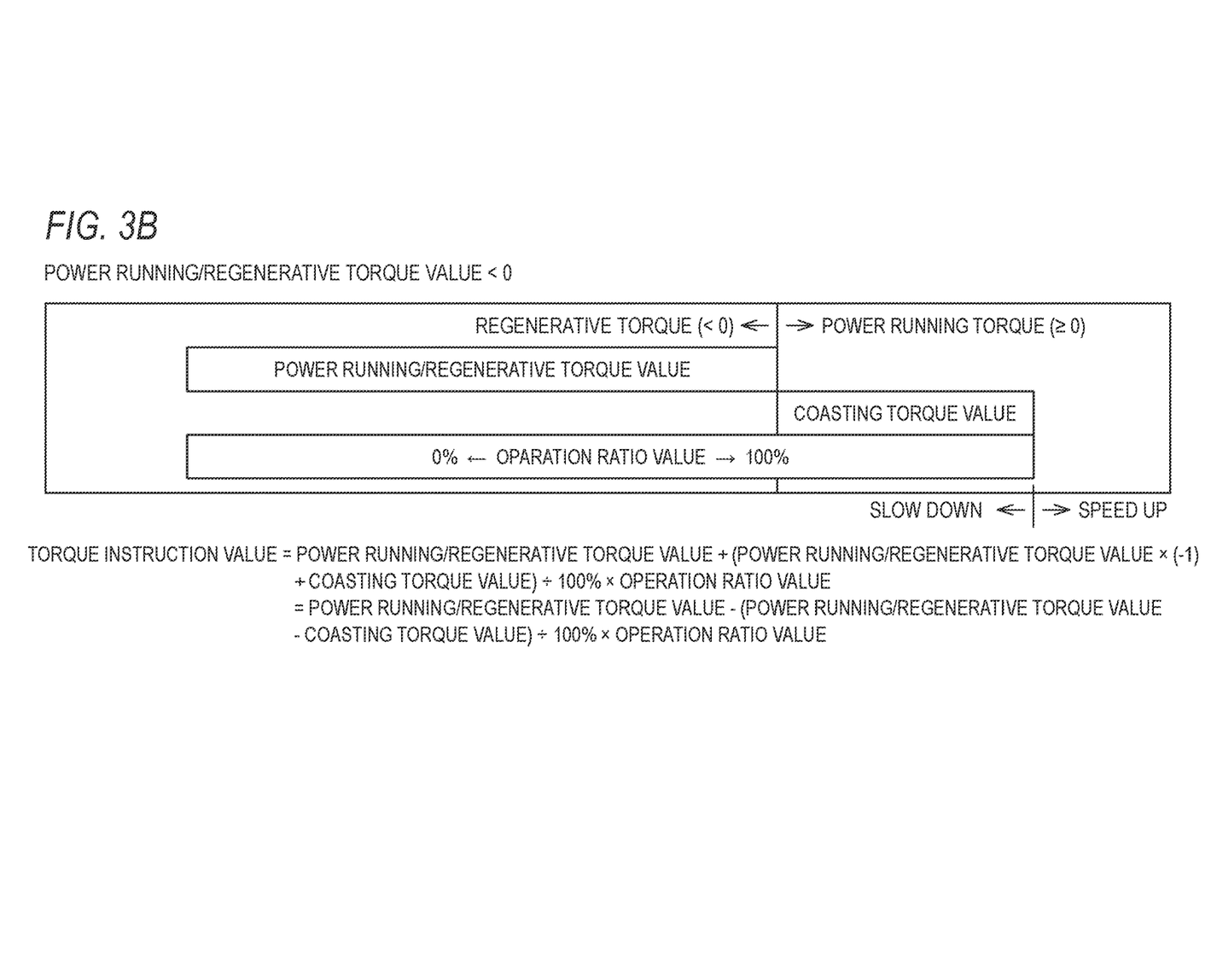
FIG. 3B is a schematic diagram of an image of calculation of the torque instruction value according to the present embodiment.
Figure 3C:
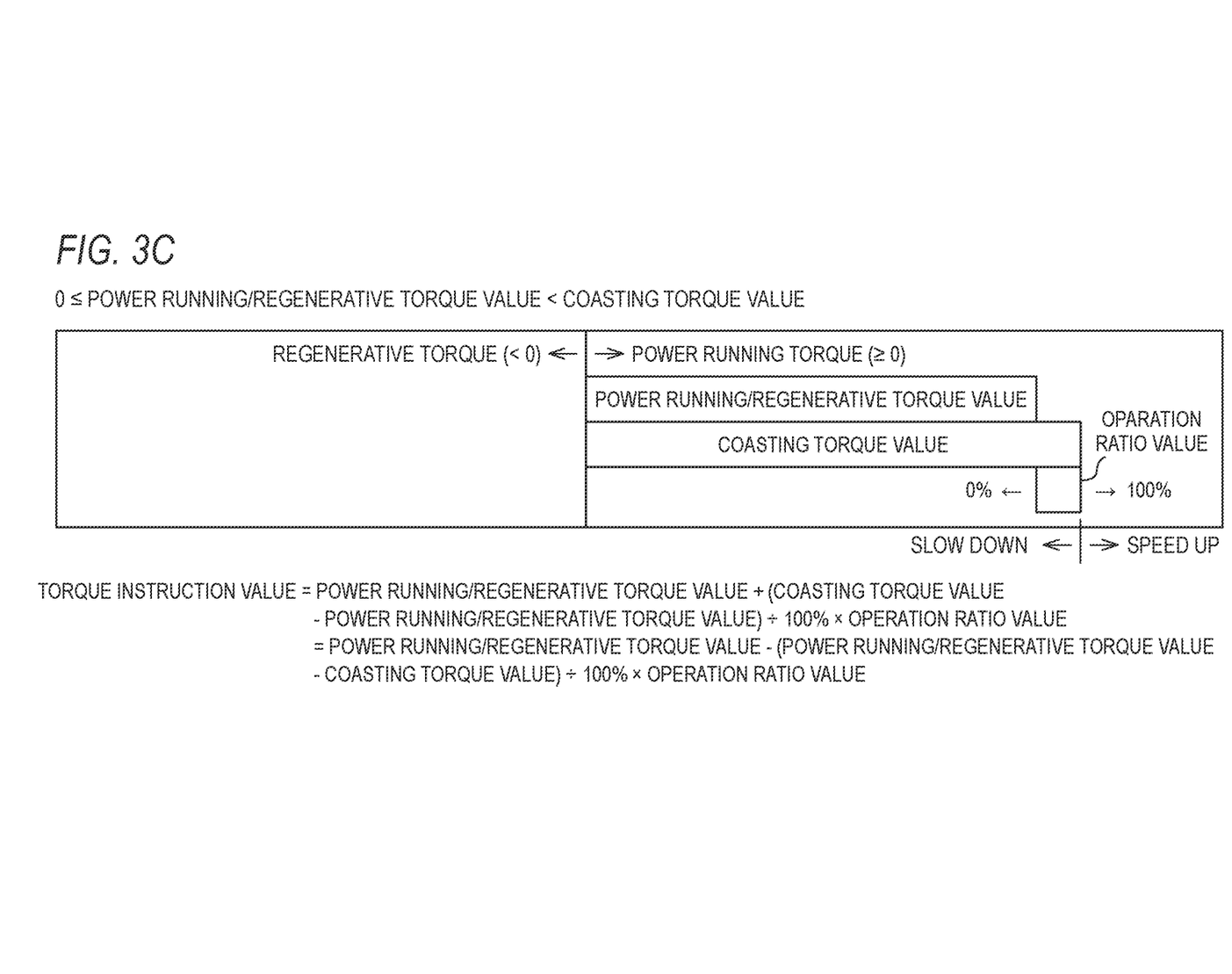
FIG. 3C is a schematic diagram of an image of calculation of the torque instruction value according to the present embodiment.

In the power running/regenerative torque map 65, a power running torque value is represented by a torque value equal to or greater than 0, and a regenerative torque value is represented by a torque value less than 0 (see FIGS. 3A to 3C). In the operation ratio map 67, the operation ratio value is set in consideration of an operation feeling given by a clutch operation. For example, when the actual clutch operation amount corresponds to 5% of the maximum clutch operation amount, the operation ratio value is set to 0%. When the actual clutch operation amount corresponds to 50% of the maximum clutch operation amount, the operation ratio value is set to 80%. When the actual clutch operation amount corresponds to 70% of the maximum clutch operation amount, the operation ratio value is set to 100%.

The calculation circuit 51 is provided with a power running/regenerative torque calculation circuit 52, a coasting torque calculation circuit 53, an operation ratio calculation circuit 54, a filter circuit 55, a multiplication circuit 56, and an instruction value calculation circuit 57. An accelerator operation amount from the accelerator sensor 34 and a motor rotation speed from the rotation speed sensor 47 are input to the power running/regenerative torque calculation circuit 52. The power running/regenerative torque calculation circuit 52 refers to the power running/regenerative torque map 65 and calculates a power running/regenerative torque value based on the accelerator operation amount and the motor rotation speed. The power running/regenerative torque value is input to the filter circuit (delay circuit) 55 and passes through the filter circuit 55, so that fluctuation of the power running/regenerative torque value is suppressed.

The motor rotation speed from the rotation speed sensor 47 is input to the coasting torque calculation circuit 53. The coasting torque calculation circuit 53 refers to the coasting torque map 66 and calculates a coasting torque value during coasting traveling based on the motor rotation speed. The coasting torque value is input to the multiplication circuit 56, and a gear constant is multiplied by the coasting torque value. The gear constant is a correction coefficient obtained based on a gear ratio of power transmission mechanism between the drive motor 21 and the rear wheel 26. A clutch operation amount from the clutch sensor 45 is input to the operation ratio calculation circuit 54. The operation ratio calculation circuit 54 refers to the operation ratio map 67 and calculates an operation ratio value based on the clutch operation amount.

The instruction value calculation circuit 57 receives the power running/regenerative torque value from the filter circuit 55, the coasting torque value from the multiplication circuit 56, and the operation ratio value from the operation ratio calculation circuit 54. The instruction value calculation circuit 57 calculates a torque instruction value by using following expression (1) based on the power running/regenerative torque value, the coasting torque value, and the operation ratio value, and outputs the torque instruction value to the motor controller 70.

$$\text{instruction value} = \text{power running/regenerative torque value} - (\text{power running/regenerative torque value} - \text{coasting torque value}) \div 100\% \times \text{operation ratio value} \quad (1)$$

The motor controller 70 is provided with a control circuit 71 that controls the driving force of the drive motor 21 in accordance with the torque instruction value from the instruction value calculation circuit 57. In the above expression (1), the torque instruction value is adjusted between the power running/regenerative torque value and the coasting torque value according to the operation ratio value (see FIGS. 3A to 3C). For example, when the operation ratio value is 0%, the torque instruction value becomes the power running/regenerative torque value, and the control circuit 71 drives the drive motor 21 based on the power running/regenerative torque value. When the operation ratio value is 100%, the torque instruction value becomes coasting torque value, and the control circuit 71 drives the drive motor 21 based on the coasting torque value.

When the clutch lever 42 is not operated, a state in which a full driving force is transmitted between the drive motor 21 and the rear wheel 26 is produced, and when the clutch lever 42 is fully operated, a state in which the driving force is cut off between the drive motor 21 and the rear wheel 26 is produced. In this way, the virtual clutch that changes the power transmission ratio between the drive motor 21 and the rear wheel 26 in accordance with the clutch operation amount (operation ratio value) is formed by the calculation circuit 51. When the virtual clutch is disengaged, a coasting torque value corresponding to the motor rotation speed is calculated by the calculation circuit 51, and the drive motor 21 is driven based on the coasting torque value by the control circuit 71 so that the straddle-type vehicle 1 performs coasting traveling.

In the motor control device 30 of the present embodiment, the coasting torque value is set to a torque value larger than zero. Therefore, pseudo coasting traveling different from actual coasting traveling in which the coasting torque value is zero is implemented. Accordingly, it is possible to improve and arrange the influence exerted by the vehicle weight, inertia, and the like on the operation feeling, and to produce coasting traveling with a sense of resistance closer to that of the engine-equipped vehicle. As described above, the motor control device 30 of the present embodiment does not stop the drive motor 21 to cause the straddle-type vehicle 1 to perform coasting traveling, but operates the drive motor 21 in consideration of traveling resistance to cause the straddle-type vehicle 1 to perform coasting traveling in a pseudo manner.

In the motor control device 30, the power running/regenerative torque value passes through the filter circuit 55, but the coasting torque value and the operation ratio value do not pass through the filter circuit 55. Although rapid fluctuation of the power running/regenerative torque value is suppressed by the filter circuit 55, fluctuation suppression processing is not performed on the coasting torque value and the operation ratio value. Accordingly, a feeling of direct torque response of the drive motor 21 with respect to a clutch operation can be produced as given by a mechanical clutch mechanism. The filter circuit 55 may be configured with a single filter circuit or a plurality of filter circuits.

The calculation circuit 51 and the control circuit 71 may be configured with a processor, or may be configured with a logic circuit (hardware). When a processor is used, the processor reads and executes a program stored in a memory to perform various type of processing. As the processor, for example, a central processing unit (CPU) may be used. The first to third storages 61 to 63 are configured with various storage media. As the storage medium, for example, a read only memory (ROM), a flash memory, or the like may be used.

An image of calculation of the torque instruction value will be described with reference to FIGS. 3A, 3B and 3C. FIGS. 3A, 3B and 3C are schematic diagrams of images of calculation of the torque instruction value according to the present embodiment, in which FIG. 3A illustrates a steady traveling/speed-up traveling state, FIG. 3B illustrates a slow-down traveling state, and FIG. 3C illustrates a low-speed traveling state. In the following description, reference sings in FIGS. 1 and 2 are used as appropriate.

As illustrated in FIG. 3A, in the steady traveling/speed-up traveling state, a positive power running/regenerative torque value (power running torque value) equal to or greater than a coasting torque value is calculated by the calculation circuit 51. At this time, an upper limit of a torque instruction value is set according to the power running/regenerative torque value, a lower limit of the torque instruction value is set according to the coasting torque value, and the torque instruction value is determined in a range from the upper limit to the lower limit according to an operation ratio value. When the operation ratio value is 0%, an upper limit of the power running/regenerative torque value is output to the motor controller 70, and when the operation ratio value is 100%, a lower limit of the coasting torque value is output to the motor controller 70. An instruction value to the motor controller 70 decreases in accordance with a clutch operation amount.

As illustrated in FIG. 3B, in the slow-down traveling state, a negative power running/regenerative torque value (regenerative torque value) is calculated by the calculation circuit 51. At this time, the upper limit of the torque instruction value is set according to a coasting torque value, the lower limit of the torque instruction value is set according to the power running/regenerative torque value, and the torque instruction value is determined in a range from the upper limit to the lower limit according to an operation ratio value. When the operation ratio value is 0%, a lower limit of the power running/regenerative torque value is output to the motor controller 70, and when the operation ratio value is 100%, an upper limit of the coasting torque value is output to the motor controller 70. A regenerative torque and a deceleration are relaxed according to a clutch operation amount.

As illustrated in FIG. 3C, in the low-speed traveling state, a positive power running/regenerative torque value (power running torque value) less than a coasting torque value is calculated by the calculation circuit 51. At this time, the upper limit of the torque instruction value is set according to the coasting torque value, the lower limit of the torque instruction value is set according to the power running/regenerative torque value, and the torque instruction value is determined in a range from the upper limit to the lower limit according to an operation ratio value. When the operation ratio value is 0%, a lower limit of the power running/regenerative torque value is output to the motor controller 70, and when the operation ratio value is 100%, an upper limit of the coasting torque value is output to the motor controller 70. An instruction value to the motor controller 70 is increased according to a clutch operation amount, but the vehicle decelerates.

Figure 4:
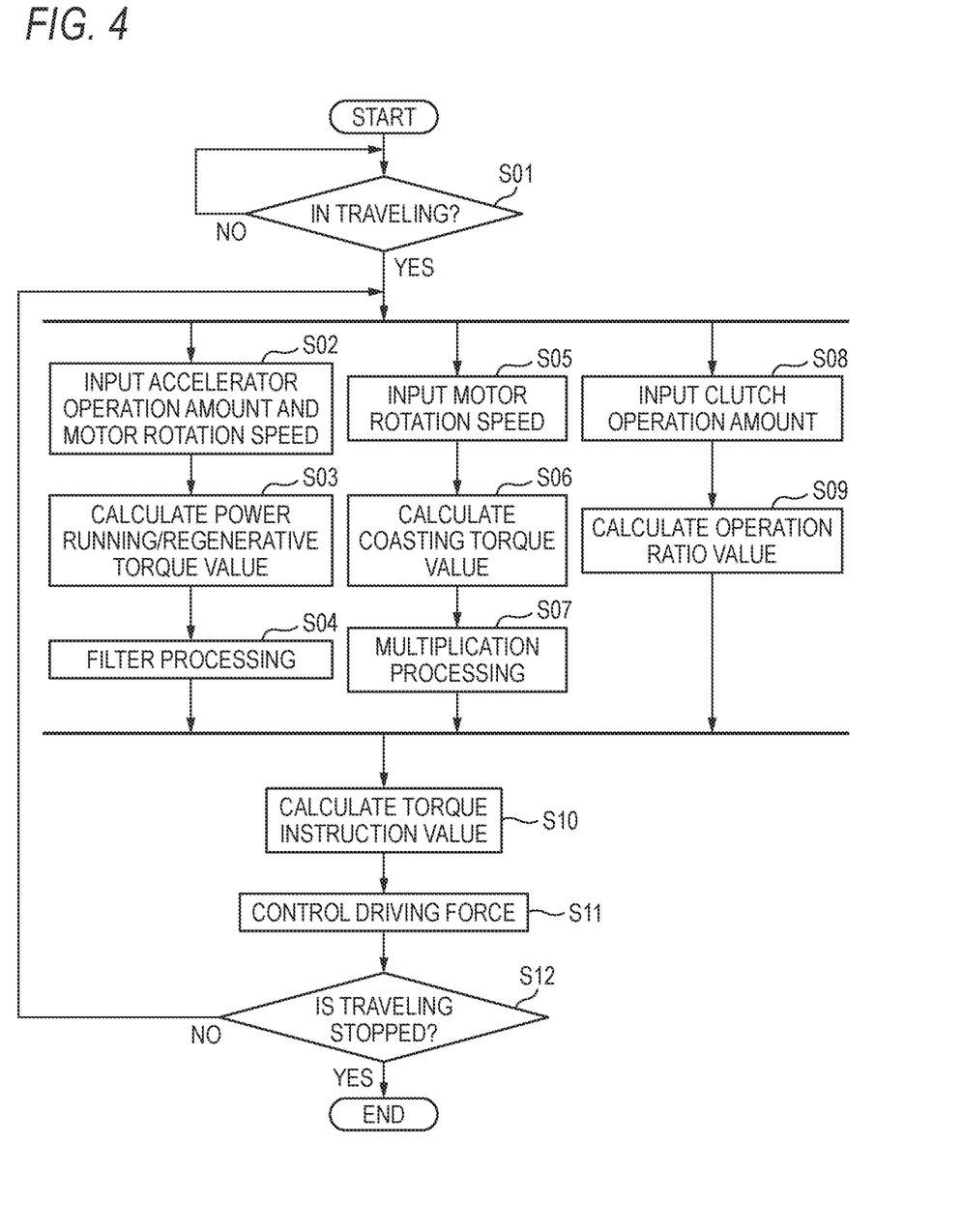
FIG. 4 is a flowchart of motor control processing according to the present embodiment.

The motor control processing will be described with reference to FIG. 4. FIG. 4 is a flowchart of the motor control processing according to the present embodiment. In the following description, reference sings in FIGS. 1 and 2 are used as appropriate.

As illustrated in FIG. 4, when the straddle-type vehicle 1 travels (Yes in step S01), the EV controller 50 performs calculation processing of a power running/regenerative torque value, a coasting torque value, and an operation ratio value in parallel. In the calculation processing of the power running/regenerative torque value, an accelerator operation amount from the accelerator sensor 34 is input to the power running/regenerative torque calculation circuit 52, and a motor rotation speed from the rotation speed sensor 47 is input to the power running/regenerative torque calculation circuit 52 (step S02). Next, the power running/regenerative torque calculation circuit 52 refers to the power running/regenerative torque map 65, and calculates the power running/regenerative torque value based on the accelerator operation amount and the motor rotation speed (step S03). Next, the filter circuit 55 performs filter processing on the power running/regenerative torque value (step S04).

On the other hand, in the calculation processing of the coasting torque value, the motor rotation speed from the rotation speed sensor 47 is input to the coasting torque calculation circuit 53 (step S05). Next, the coasting torque calculation circuit 53 refers to the coasting torque map 66, and calculates the coasting torque value based on the motor rotation speed (step S06). Next, the multiplication circuit 56 performs multiplication processing on the coasting torque value (step S07). In addition, in the calculation processing of the operation ratio value, a clutch operation amount from the clutch sensor 45 is input to the operation ratio calculation circuit 54 (step S08). Next, the operation ratio calculation circuit 54 refers to the operation ratio map 67, and calculates the operation ratio value based on the clutch operation amount (step S09).

After the calculation processings of the power running/regenerative torque value, the coasting torque value, and the operation ratio value, the instruction value calculation circuit 57 calculates a torque instruction value based on the power running/regenerative torque value, the coasting torque value, and the operation ratio value (step S10). In this case, the torque instruction value in consideration of the power transmission ratio by the virtual clutch is calculated by using the above expression (1). Next, the control circuit 71 of the motor controller 70 controls the driving force of the drive motor 21 based on the torque instruction value (step S11). Then, the various types of processing of steps S02 to S11 are repeated until the straddle-type vehicle 1 is stopped (step S12).

As described above, according to the present embodiment, the torque instruction value is calculated by the calculation circuit 51 of the EV controller 50 based on the accelerator operation amount, the motor rotation speed, and the change operation amount, and the driving force of the drive motor 21 is controlled by the control circuit 71 of the motor controller 70 according to the torque instruction value. At this time, since the virtual clutch is formed by the calculation circuit 51, it is possible to bring the operation feeling given by the electric vehicle close to that given by the clutch mechanism of the engine-equipped vehicle. When the virtual clutch is disengaged, the operation feeling given by the electric vehicle can be brought close to the operation feeling given by the engine-equipped vehicle by pseudo coasting traveling by the drive motor 21. In addition, since a flywheel or the like is not provided, inertia applied to the drive motor 21 can be reduced, and the response performance of the drive motor 21 can be maximized.

Although the calculation circuit calculates the torque instruction value as an instruction value for the drive motor in the present embodiment, the calculation circuit may calculate an instruction value that makes it possible to control the drive motor. For example, the calculation circuit may calculate a current instruction value as the instruction value to adjust a value of a current flowing through the drive motor. In this case, without using the map, a value of a current to be supplied to the drive motor may be adjusted by an accelerator operation, and the value of the current may be increased or decreased by the clutch operation. The calculation circuit may calculate an instruction value of a motor rotational acceleration as the instruction value to adjust a motor rotational acceleration of the drive motor.

In addition, although the configuration in which the rotation speed sensor is a resolver fixed to the drive motor has been described in the present embodiment, the rotation speed sensor may be configured with a vehicle speed sensor. That is, the motor rotation speed may be indirectly detected by the vehicle speed sensor.

In addition, although the calculation circuit is provided in the EV controller and the control circuit is provided in the motor controller in the present embodiment, the calculation circuit and the control circuit may be provided in a single controller.

In addition, although a configuration in which the change operator is a clutch lever has been described in the present embodiment, the change operator may be configured with a clutch pedal.

In addition, although the power running/regenerative torque map is used for the calculation processing of the power running/regenerative torque value in the present embodiment, other types of reference data making it possible to obtain the power running/regenerative torque value based on the accelerator operation amount and the motor rotation speed may be used. For example, the power running/regenerative torque value may be obtained based on the accelerator operation amount and the motor rotation speed by using a lookup table.

In addition, although the coasting torque map is used for the calculation processing of the coasting torque value in the present embodiment, other types of reference data making it possible to obtain the coasting torque value based on the motor rotation speed may be used. For example, the coasting torque value may be obtained based on the motor rotation speed by using a lookup table.

In addition, although the operation ratio map is used for the calculation processing of the operation ratio value in the present embodiment, other types of reference data making it possible to obtain the operation ratio value based on the clutch operation amount may be used. For example, the operation ratio value may be obtained based on the clutch operation amount by using a lookup table.

In addition, although the filter circuit and the multiplication circuit are provided in the calculation circuit in the present embodiment, the filter circuit and the multiplication circuit may not be provided in the calculation circuit.

In addition, although the torque instruction value is calculated using the above expression (1) in the present embodiment, the torque instruction value may be calculated using another method as long as the torque instruction value is calculated based on the accelerator operation amount, the motor rotation speed, and the clutch operation amount.

In addition, although the operation feeling given by the engine-equipped vehicle including a clutch is represented by a driving torque in the present embodiment, a change in sound or an increase or decrease in vibration accompanying a change in the rotation speed of the drive motor may be reproduced. In this case, a mechanism for generating sound and vibration is added to the motor control device, and this mechanism generates sound and vibration in conjunction with a throttle operation and the clutch operation not in conjunction with the motor rotation speed. Accordingly, an atmosphere of riding in the engine-equipped vehicle can be produced.

In addition, the straddle-type vehicle of the present embodiment is not limited to general vehicles on which the driver rides in a posture of straddling the seat, and includes a scooter type vehicle on which the driver rides without straddling the seat. The straddle-type vehicle is not limited to a motorcycle, and may be any vehicle on which a drive motor is mounted.

As described above, a motor control device (30) of the present embodiment is configured to control a drive motor (21) configured to output a driving force to a wheel (rear wheel 26), the motor control device including: an accelerator operator (accelerator grip 31) that is configured to receive an accelerator operation; a change operator (clutch lever 42) that is configured to receive a change operation for the driving force of the drive motor; a rotation speed sensor (47) that is configured to detect a motor rotation speed of the drive motor; a calculation circuit (51) that is configured to calculate an instruction value based on an amount of the accelerator operation, the motor rotation speed, and an amount of the change operation; and a control circuit (71) that is configured to control the driving force of the drive motor in accordance with the instruction value from the calculation circuit. The calculation circuit is configured to form a virtual clutch configured to change a power transmission ratio between the drive motor and the wheel according to the amount of the change operation, and to calculate the instruction value corresponding to coasting traveling according to the motor rotation speed when the virtual clutch is disengaged. According to this configuration, the calculation circuit calculates the instruction value based on the accelerator operation amount, the motor rotation speed, and the change operation amount, and the control circuit controls the driving force of the drive motor according to the instruction value. At this time, since the virtual clutch is formed by the calculation circuit, it is possible to bring an operation feeling given by an electric vehicle close to that given by a clutch mechanism of an engine-equipped vehicle. When the virtual clutch is disengaged, the operation feeling given by the electric vehicle can be brought close to the operation feeling given by the engine-equipped vehicle by pseudo coasting traveling by the drive motor. Further, since a flywheel or the like is not provided, inertia applied to the drive motor can be reduced, and response performance of the drive motor can be maximized.

The motor control device of the present embodiment further includes: a first storage (61) that is configured to store a power running/regenerative torque map (65) for obtaining a power running/regenerative torque value based on the amount of the accelerator operation and the motor rotation speed, a second storage (62) that is configured to store a coasting torque map (66) for obtaining a coasting torque value during the coasting traveling based on the motor rotation speed; and a third storage (63) that is configured to store an operation ratio map (67) for obtaining an operation ratio value of an actual amount of the change operation with respect to a maximum amount of the change operation. The calculation circuit is configured to calculate the instruction value based on the power running/regenerative torque value, the coasting torque value, and the operation ratio value, and the calculation circuit is configured to form the virtual clutch that is configured to change the power transmission ratio between the drive motor and the wheel according to the operation ratio value, and to calculate the coasting torque value as the instruction value when the virtual clutch is disengaged. According to this configuration, it is possible to cause the drive motor to output the driving force in consideration of the power transmission ratio by the virtual clutch based on the power running/regenerative torque value, the coasting torque value, and the operation ratio value. With the coasting torque map, coasting traveling different from actual traveling resistance can be implemented, and influence exerted by a vehicle weight, inertia, and the like on the operation feeling can be improved and arranged.

In the motor control device of the present embodiment, the calculation circuit is configured to calculate the instruction value based on the power running/regenerative torque value, the coasting torque value, and the operation ratio value by using a following expression (1).

$$\text{instruction value} = \text{power running/regenerative torque value} - (\text{power running/regenerative torque value} - \text{coasting torque value}) \div 100\% \times \text{operation ratio value} \quad (1)$$

According to this configuration, it is possible to cause the drive motor to output the driving force in consideration of the power transmission ratio by the virtual clutch.

In the motor control device of the present embodiment, the calculation circuit includes a filter circuit (55) that is configured to suppress fluctuation of the power running/regenerative torque value, and suppression processings of fluctuation in the coasting torque value and the operation ratio value are not performed. According to this configuration, since fluctuation in the operation ratio value is not suppressed by the filter, a feeling of direct torque response of the drive motor with respect to a change operation can be produced as given by a clutch mechanism of the engine-equipped vehicle.

In the motor control device of the present embodiment, the coasting torque value is a torque value larger than zero. According to this configuration, coasting traveling with traveling resistance close to that of the engine-equipped vehicle can be produced. In addition, it is possible to improve and arrange the influence exerted by a vehicle weight, inertia, and the like on the operation feeling.

In the motor control device of the present embodiment, the change operator is a clutch lever. According to this configuration, it is possible to operate in the same manner as in the engine-equipped vehicle.

Although the present embodiment has been described, the above-described embodiment and a modification may be combined in whole or in part as other embodiment.

The technique of the present invention is not limited to the above-described embodiment, and various changes, substitutions, and modifications may be made without departing from the spirit of the technical idea of the present invention. The present invention may be implemented using other methods as long as the technical idea can be implemented by the methods through advance of the technology or other derivative technology. Accordingly, the claims cover all embodiments that may be included within the scope of the technical idea.

What is claimed is:

1. A motor control device that is configured to control a drive motor configured to output a driving force to a wheel, the motor control device comprising:
    an accelerator grip that is configured to receive an accelerator operation;
    a clutch lever or a clutch pedal that is configured to receive a change operation for the driving force of the drive motor;
    a rotation speed sensor that is configured to detect a motor rotation speed of the drive motor;
    a calculation circuit that is configured to calculate an instruction value based on an amount of the accelerator operation, the motor rotation speed, and an amount of the change operation; and
    a control circuit that is configured to control the driving force of the drive motor in accordance with the instruction value from the calculation circuit,
    wherein the calculation circuit is configured to form a virtual clutch configured to change a power transmission ratio between the drive motor and the wheel according to the amount of the change operation, and to calculate the instruction value corresponding to coasting traveling according to the motor rotation speed when the virtual clutch is disengaged such that pseudo coasting traveling is implemented by the motor control device.

2. The motor control device according to claim 1, further comprising:
    a first storage medium that is configured to store a power running/regenerative torque map for obtaining a power running/regenerative torque value based on the amount of the accelerator operation and the motor rotation speed;
    a second storage medium that is configured to store a coasting torque map for obtaining a coasting torque value during the coasting traveling based on the motor rotation speed; and
    a third storage medium that is configured to store an operation ratio map for obtaining an operation ratio value of an actual amount of the change operation with respect to a maximum amount of the change operation,
    wherein the calculation circuit is configured to calculate the instruction value based on the power running/regenerative torque value, the coasting torque value, and the operation ratio value, and
    wherein the calculation circuit is configured to form the virtual clutch that is configured to change the power transmission ratio between the drive motor and the wheel according to the operation ratio value, and to calculate the coasting torque value as the instruction value when the virtual clutch is disengaged.

3. The motor control device according to claim 2, wherein the calculation circuit is configured to calculate the instruction value based on the power running/regenerative torque value, the coasting torque value, and the operation ratio value by using a following expression (1).

$$\text{instruction value} = \text{power running/regenerative torque value} - (\text{power running/regenerative torque value} - \text{coasting torque value}) \div 100\% \times \text{operation ratio value} \quad (1)$$

4. The motor control device according to claim 2, wherein the calculation circuit includes a filter circuit that is configured to suppress fluctuation in the power running/regenerative torque value, and suppression processings of fluctuation in the coasting torque value and the operation ratio value are not performed.

5. The motor control device according to claim 2, wherein the coasting torque value is a torque value larger than zero.

* * * * *